UNITED STATES PATENT OFFICE 2,515,173

DIIMIDAZOLES AND PROCESS OF MAKING SAME

Franz Ackermann, Binningen, and Jules Meyer, Basel, Switzerland, assignors to Ciba Limited, Basel, Switzerland, a Swiss firm No Drawing. Application March 12, 1948, Serial No. 14,626. In Switzerland March 19, 1947

15 Claims. (Cl. 260—240)

According to this invention new N-mono-substituted diimidazoles of the formula

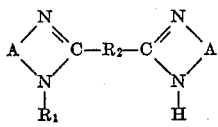

in which A represents an aromatic nucleus, for example, a radical of the benzene or naphthalene series, of which two vicinal carbon atoms are bound to the two imidazole nitrogen atoms, $R_1$ represents a substituent, and $R_2$ represents a divalent aliphatic radical which contains at least one double bond, all the double bonds of the imidazole rings and of the radical $R_2$ forming an uninterrupted series of conjugated double bonds, are obtained by treating a diimidazole of the formula

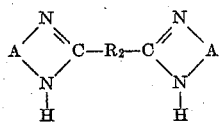

in which A and $R_2$ have the meanings given above, with an alkylating or aralkylating agent under conditions such that complete disubstitution does not occur, and, if desired, separating the reaction mixture into different components; or by reacting an appropriate saturated fatty acid, which has a straight chain of an odd number of carbon atoms which is at least 3 and at the end of which chain is an arylimidazyl-(2) residue which may be substituted, with the aid of heat with an ortho-phenylene diamine to form the diimidazole, the starting components being so selected that only one of them carries an alkyl, aryl or aralkyl residue bound to a nitrogen atom, and then heating the product with a dehydrogenating agent.

The new diimidazoles obtained in the above manner are not of the character of dyestuffs, but exhibit in solution or after application to a substratum a more or less pronounced fluorescence, and also have a more or less pronounced affinity for cellulose fibers. By virtue of these properties the products of the invention, which exhibit a blue to violet fluorescence in daylight and in ultraviolet light, improve materials, especially cellulose fibers, to which they have been applied, with respect to whiteness in the case of undyed materials and with respect to purity of color in the case of dyed materials. In the case of undyed, originally yellowish materials the effect of applying thereto the compound having a blue to violet fluorescence is to impart to the material a white appearance.

Among the starting materials of the second of the above formulae there may be mentioned above all products of the formula

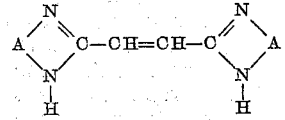

in which A may represent, for example, a benzene nucleus which may contain a substituent, for example, an alkyl radical such as a methyl or ethyl group, or other substituent such as an alkoxy group or a halogen atom.

As alkylating agents for use in the invention there may be mentioned alkyl halides, such as alkyl chlorides, for example, methyl chloride, ethyl chloride, butyl chlorides or hexyl chlorides, and also alkyl halides containing a substituted alkyl radical, for example, ethylene chlorhydrin, ethylene bromhydrin, propylene halogen-hydrins or butylene halogen-hydrins. As is known, the last named halogen-hydrins and also the 1:2-alkylene oxides which are distinguished by a special reactivity, particular mention being made of epichlorhydrin and glycide, belong also to the alkylating agents, and may be designated as "hydroxy alkylating agents." As alkylating agents there also come into consideration, however, dialkyl sulfates. As is known, methyl halides, such as methyl chloride and dimethyl sulfate are methylating agents. Examples for ethylating agents are ethyl chloride and diethylsulfate. Especially suitable products, which are distinguished by their ready accessibility and favorable properties, are obtained by reaction with ethylene chlorhydrin.

Among aralkylating agents there may be mentioned aralkyl halides, such as benzyl chloride and its homologues, and also aralkyl halides containing a halogen atom in the aryl nucleus.

The monosubstitution of the above mentioned diimidazoles in accordance with the invention may be carried out, for example, by causing the alkylating or aralkylating agent to act on a solution of the diimidazole with the aid of heat. For each mol of the diimidazole there is used a quantity sufficient for the substitution of only one imino group, preferably at least 1 mol and advantageously less than 2 mols, especially 1.25–1.5 mols, of the alkylating or aralkylating agent. As the diimidazoles used as starting materials are sparingly soluble in most solvents there are advantageously used solutions of the more easily soluble alkali salts, for example, solutions thereof in ethyl alcohol. The reaction may take place, for example, at 40–150° C.; when using alkyl or aralkyl halides of dialkyl sulfonates the reaction is advantageously conducted at the boiling point of the solvent. The reactive 1:2-alkylene oxides, such as epichlorohydrin or glycide react already at a relatively low temperature, for example, at about 50° C. There are generally obtained mixtures which contain, in addition to the N-monosubstitution product, varying quantities of the unsubstituted diimidazole or its N:N'-disubstitution product depending on the quantity of the alkylating or aralkylating agent. Such mixtures can be separated without difficulty into their individual components by reason of differing solubility. However, for many purposes such separation, especially in the case of mixtures of mono- and di-substitution products, is unnecessary.

Among the saturated fatty acids also coming into consideration as starting materials, and which fatty acids have a straight chain of an odd number of carbon atoms which is at least 3 and at the end of which chain is an aryl-imidazyl-(2)-radical which may be substituted, there come principally into consideration β-[benzimidazyl-(2)]-propionic acid and derivatives thereof, which contain a substituent at the nitrogen atom or in the benzene nucleus or both. There may be mentioned for example, β-[N-alkyl-benzimidazyl-(2)]-propionic acids, such as β - [N - hydroxyethyl - benzimidazyl - (2)] - propionic acid or β-[N - benzyl - benzimidazyl-(2)]-propionic acid. The ortho-phenylene diamine which is to be reacted with the substituted carboxylic acid to form a diimidazole may contain at the nitrogen atom a substituent, for example an alkyl radical, (including a hydroxyalkyl radical), an aryl radical or an aralkyl radical, provided that the other component, namely the imidazyl-carboxylic acid, contains no substituent at the nitrogen atom.

The reaction of the substituted carboxylic acid with the ortho-phenylene diamine to form the diimidazole is brought about with the aid of heat.

As dehydrogenating agents there come into consideration, for example, mild oxidizing agents. Among these, there may be mentioned, for example, compounds of divalent mercury such as mercuric acetate or mercuric oxide; potassium permanganate or manganese dioxide; copper oxide or copper sulfate; hydrogen peroxide, selenium dioxide; platinum oxide; and more especially, ferric salts such as ferric sulfate, ferric chloride or potassium ferricyanide. As dehydrogenating agents there may also be used dehydrogenating catalysts, for example finely divided nickel, copper, platinum, or palladium, either as such or carried on a support.

The most suitable dehydrogenating agents are, however, mild oxidizing agents such as ferric sulfate.

The treatment with the dehydrogenating agent is conducted at a raised temperature for example, at 80–300° C., advantageously in the presence of a solvent for the diimidazole, for example, with the addition of glacial acetic acid or a dilute mineral acid. Thus, for example, mercuric acetate soluble in glacial acetic acid may be caused to act on a solution of a substituted diimidazole of the kind described above in glacial acetic acid, for example, at 100–150° C. Ferric sulfate, which has proved to be an especially advantageous dehydrogenating agent, may be brought into reaction advantageously at a temperature above 100° C. for example, at 150–210° C., preferably with the addition of a dilute mineral acid such as dilute sulfuric acid. When finely divided nickel is used as the dehydrogenating agent for catalytic dehydrogenation the process may be conducted by heating at 250–300° C. with the exclusion of air, in which case fused 2-methyl-benzimidazole, for example, may be used as a solvent. The products of the invention may be designated as diimidazoles of the general formula

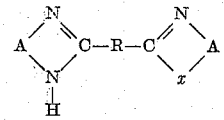

wherein A is an aromatic radical in which two vicinal carbon atoms are bound to the nitrogen atoms of the imidazole rings, $x$ is the nitrogen atom of a tertiary amino group, and R is a bivalent aliphatic radical containing at least one double bond, all double bonds of the imidazole nuclei and of the radical R forming an uninterrupted series of conjugated double bonds. As examples for the product of the invention there are mentioned the products of the formula

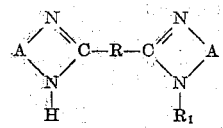

wherein A and R have the signification given above, and $R_1$ stands for an alkyl radical (including substituted alkyl radicals, such as hydroxyalkyl radicals), an aryl radical or an aralkyl radical. In addition to hydroxyl groups, the radical $R_1$ may also contain other substituents, for example, halogen atoms. Products of the invention in which $R_1$ represents an alkyl radical with several OH-groups, are the reaction products with glycide. Products of the formula

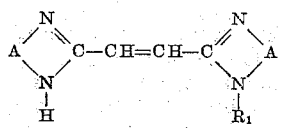

wherein A stands for a benzene nucleus and $R_1$ has the aforesaid signification, are distinguished by the ease with which they can be prepared and by their high effectiveness.

Finally, the products of the invention may be obtained, for example, by dehydrogenating suitable fatty acids, containing at the end of the carbon chain an arylimidazyl-(2) radical, such as β-benzimidazyl-(2)-propionic acid according to the above indicated dehydrogenating process to form unsaturated acids of the formula

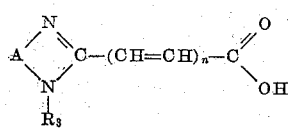

wherein A has the meaning given above, $R_3$ is hydrogen or a substituent and $n$ is a small whole number, such as β-benzimidazyl-(2)-acrylic acid, and subsequently condensing the product with an ortho-phenylene diamine to form a diimidazole. Care must however be taken that only one of the two components contains one of the already indicated substituents attached to an N-atom.

The products of the invention can be used in the manner described below for improving materials.

The material to be treated may be impregnated with a solution or dispersion of the product and dried after being centrifuged or squeezed. For this purpose there are suitable, for example, solutions of metal salts, especially alkali salts of the product. As solvents for these metal salts there come into consideration, for example, alcohols such as ethyl alcohol. There may, however, be used for the treatment of materials solutions, especially aqueous solutions, of salts of imidazoles of the invention with acids. Dispersions of the diimidazoles of the invention also suitable for improving materials may be prepared with the aid of dispersing agents, such as soaps, soap-like substances, polyglycol ethers of fatty alcohols, sulfite cellulose waste liquor or condensation products of, if desired, alkylated naphthalene sulfonic acids with formaldehyde.

It is also possible to apply the diimidazoles of the invention in the course of the manufacture of the material to be improved, by incorporating the diimidazole, for example, in a paper pulp or a viscose solution to be used for the production of films or threads, or in another spinning mass, for example, in such a mass comprising a linear synthetic polyamide or in an acetyl-cellulose spinning solution.

Small quantities of the products to be used generally suffice to bring about an improvement in the material.

The compounds to be applied in accordance with the invention may be used in admixture with auxiliary substance such as are used for improving fibrous materials, for example, in conjunction with washing agents, for example, soaps, salts of sulfonated benzimidazoles substituted at the 2-carbon atom by a higher alkyl residue, monocarboxylic acid esters of 4-sulfophthalic acid with higher fatty alcohols, or together with fatty alcohol sulfonates or condensation products of higher fatty acids with aliphatic hydroxy- or amino-sulfonic acids. In this manner the material to be treated may be simultaneously washed and bleached.

The aforesaid mixtures with washing agents possess in general the following advantages: They have a great brightening action; they may also possess the property of being almost insensitive to moisture and therefore undergo practically no change in color during storage, in contradistinction to known N:N'-disubstituted diimidazoles; furthermore they may be more suitable for treating materials containing lime soaps since they may possess the property of imparting practically no coloration to specks of lime soap present in the material, whereas N:N'-disubstituted diimidazoles of comparable constitution tend to impart a yellowish coloration to these specks. An especially pronounced brightening is produced by treating undyed cellulosic materials with mixtures containing such washing agents.

As materials which may be treated with the compounds of the invention there may be mentioned the following: Cellulosic materials such as cellulose, paper and also textile materials of cotton, linen, regenerated cellulose, including staple fibers of regenerated cellulose, furthermore, natural or artificial nitrogenous materials, such as wool, silk or synthetic polyamide fibers; and finally synthetic materials produced, for example, by polymerisation. The material to be improved may be in any desired form, for example, in fibrous form or in the form of a film. Furthermore, the material may, for example, be undyed, dyed or printed.

In copending application Serial No. 581,964, filed March 9, 1945, now Patent No. 2,488,094, there is described a process for the manufacture of diimidazoles of the formula

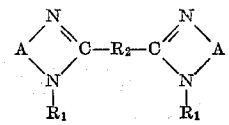

wherein A is a radical of the benzene series in which two vicinal carbon atoms are connected to the nitrogen atoms of the imidazole rings, $R_1$ is hydrogen, alkyl or aralkyl and $R_2$ is a bivalent unsaturated radical containing at least one double bond forming with the

double bonds of the imidazole nuclei an uninterrupted series of conjugated double bonds, which comprises condensing an orthodiamine of the benzene series with an unsaturated dicarboxylic acid. In copending application Serial No. 630,118, filed November 21, 1945, now Patent No. 2,488,289, there is described the manufacture of $\alpha:\beta$-di-[benzimidazyl-(2)]-ethylenes by dehydrogenation of the corresponding $\alpha:\beta$-di-[benzimidazyl-(2)]-ethanes, and in copending application Serial No. 515,024, filed December 20, 1943, (Patent No. 2,463,264) there is described a process for the manufacture of water-soluble $\alpha:\beta$-di-[benzimidazyl-(2)]-ethylenes.

The following examples illustrate the invention, the parts being by weight unless otherwise stated and the relationship of parts by weight to parts by volume being the same as that of the kilogram to the liter:

*Example 1*

A solution of 104 parts of $\alpha:\beta$-di-[benzimidazyl-(2)]-ethylene in 500 parts of ethyl alcohol and 221 parts of caustic soda solution of 30 per cent strength is stirred with 30–60 parts of methyl chloride for about 6 hours in a pressure vessel at 80–90° C.

After cooling, a small quantity of $\alpha:\beta$-di-[N-methyl-benzimidazyl-(2)]-ethylene which separates is removed by filtration, the filtrate is poured into water, and the precipitate is separated by filtration and washed with water. In order to remove residual starting material the product is heated with acetic acid of 25 per cent strength, filtered, the filtrate is mixed with ammonia and the precipitated $\alpha$-[benzimidazyl-(2)]-$\beta$-[N-methyl-benzimidazyl-(2)]-ethylene of the formula

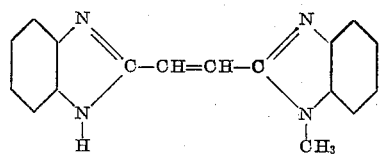

is separated by filtration and washed with water. It may be obtained in the pure state by way of its hydrochloride.

The new base is a pale yellow crystalline powder which when dissolved in alcohol or acetone exhibits a violet-blue fluorescence.

In a similar manner the diimidazole of the formula

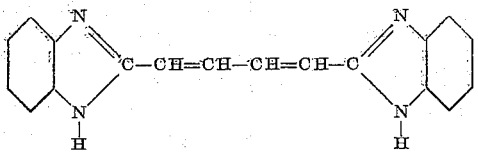

may also be mono-methylated. Instead of methyl chloride, also ethyl chloride may be used in the above mentioned reactions.

*Example 2*

A solution of 44 parts of dimethyl-β-chlorethylamine hydrochloride in 300 parts of ethyl alcohol is added dropwise in the course of 2-3 hours to a boiling solution of 52 parts of α:β-di-[benzimidazyl-(2)]-ethylene in 350 parts of ethyl alcohol and 110 parts of caustic soda solution of 30 per cent strength. The whole is maintained at the boil for about 2 hours longer, filtered to remove small quantities of by-products, water is added to the hot solution until a slight turbidity occurs, and the whole is allowed to cool.

The condensation product which precipitates is separated by filtration and washed with dilute aqueous alcohol. It may be purified by way of its hydrochloride.

The resulting α-[benzimidazyl-(2)]-β-[N-(dimethylaminoethyl)-benzimidazyl-(2)]-ethylene of the formula

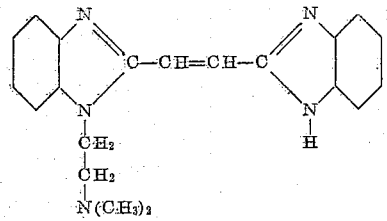

is a bright powder which when dissolved in alcohol exhibits a violet-blue fluorescence.

*Example 3*

24 parts of ethylene chlorhydrin are added in the course of about 2 hours to a boiling solution of 72 parts of the acid sulfate of α:β-di-[benzimidazyl-(2)]-ethylene in 600 parts of ethyl alcohol and 160 parts of caustic soda solution of 30 per cent strength. The whole is heated at the boil for a further 2 hours under reflux, and then allowed to cool. A small quantity of α:β-di-[N-hydroxyethyl-benzimidazyl-(2)]-ethylene which precipitates is separated by filtration, the filtrate is poured into water, and the precipitated α-[benzimidazyl-(2)]-β-[N-hydroxyethyl-benzimidazyl-(2)]-ethylene of the formula

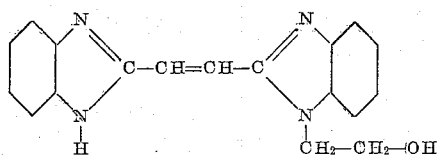

is separated by filtration and washed with water. It can be obtained in the pure state by way of its hydrochloride. The new base so obtained is a pale yellow powder which when dissolved in alcohol exhibits a violet-blue fluorescence.

Instead of ethylene chlorhydrin, propylene chlorhydrin may be used in a similar manner.

*Example 4*

32 parts of benzyl chloride are gradually added to a boiling solution of 52 parts of α:β-di-[benzimidazyl-(2)]-ethylene in 320 parts of ethyl alcohol and 120 parts of caustic soda solution of 30 per cent strength. The whole is stirred for a further 2 hours at the boiling point and then allowed to cool. A small quantity of α:β-di-[N-benzyl-benzimidazyl-(2)]-ethylene which precipitates is separated by filtration, the filtrate is poured into water, and the precipitated α-[benzimidazyl-(2)]-β-[N-benzyl-benzimidazyl-(2)]-ethylene of the formula

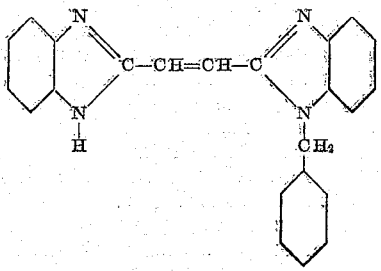

is separated by filtration, washed with water and dried. It is obtained in the pure state by recrystallisation from alcohol. It is a pale yellow powder which exhibits a violet-blue fluorescence in alcoholic solution.

*Example 5*

26 parts of α:β-di-[benzimidazyl-(2)]-ethylene are added to a solution of 7 parts of sodium in 600 parts of absolute alcohol. The whole is heated at the boil under reflux, and 17.4 parts of diethyl sulfate are added to the boiling solution in the course of 2 hours. The whole is stirred for a short time at the boiling point and then allowed to cool. A small quantity of α:β-di-[N-ethyl-benzimidazyl-(2)]-ethylene which precipitates is separated by filtration. The filtrate is poured into water, the precipitated α-[benzimidazyl-(2)]-β-[N-ethyl-benzimidazyl-(2)]-ethylene is separated, washed neutral with water and dried. It can be obtained in the pure state by way of its hydrochloride or by recrystallisation from an alcoholic solution of sodium hydroxide. It is then obtained in the form of a pale yellow powder which exhibits a blue-violet fluorescence in alcoholic solution.

*Example 6*

A solution of 2.6 parts of α-[benzimidazyl-(2)]-β-[N-methylbenzimidazyl-(2)]-ethane in 10 parts of glacial acetic acid is heated for 3 hours at 140° C. with a solution of 6.8 parts of mercuric acetate in 30 parts of glacial acetic acid. After a short time the mixture acquires a yellowish coloration and finally becomes greenish yellow. The mixture is decanted while hot to separate precipitated metallic mercury, and the solvent is distilled off finally under reduced pressure. The dry residue is digested for about ½ hour with water and concentrated ammonia solution, the suspension is filtered and the filter residue is washed neutral and dried. In order to purify the dehydrogenation product it is dissolved in 150 parts of hot isopropanol, the whole is filtered to remove the undissolved mercury compound which remains, and the filtrate is heated with animal charcoal for ½ hour at the boil. The solution is then filtered and the isopropanol is removed by distillation.

The α-[benzimidazyl-(2)]-β-[N-methylbenzimidazyl-(2)]-ethylene so obtained is a pale yellow powder which exhibits a strong blue fluorescence when dissolved in alcohol.

The aforesaid α - [benzimidazyl - (2)] - β - [N-methyl-benzimidazyl-(2)]-ethane may be prepared in the following manner:

20 parts of dimethyl sulfate are added dropwise in the course of 1 hour to a solution, heated to 70–80° C., of 26.2 parts of α:β-di-[benzimidazyl-(2)]-ethane in 800 parts of ethyl alcohol and 140 parts of caustic soda solution of 30 per cent strength. After cooling, the precipitated α:β-di-[N-methyl-benzimidazyl-(2)] - ethane is separated by filtration and the filtrate is poured into water. The precipitated powder is separated by filtration, washed neutral with water, and fractionally crystallised from aqueous alcohol.

The resulting α-[benzimidazyl - (2)] - β - [N-methyl-benzimidazyl-(2)]-ethane is a pale powder which is soluble in alcohol.

Example 7

100 parts of a fused soap mass containing, for example, 60 per cent of fatty acid are stirred with 0.005–0.5 part of α - [benzimidazyl - (2)]-β-[N-methyl-benzimidazyl-(2)]-ethylene of the formula

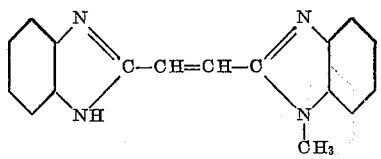

(see Example 1). The mass is allowed to solidify to yield a soap-like preparation. Cellulosic material which has been washed with this preparation possesses a whiter appearance than if the material had been washed with the soap alone.

In order to facilitate its dispersion the imidazole derivative may first be dissolved in a small quantity of alcoholic caustic soda solution or in alcohol alone or in another solvent which is miscible with water, and added to the soap in the form of such a solution. Alternatively, the imidazole derivative may first be mixed with a liquid or fused free fatty acid, and then converted into a soap-like preparation in the usual manner by neutralising the fatty acid.

Example 8

The procedure is the same as that described in Example 7, except that, instead of α-[benzimidazyl-(2)]-β-[N-methylbenzimidazyl-(2)] - ethylene, there is used α-[benzimidazyl-(2)]-β-[N-(dimethylaminoethyl) - benzimidazyl-(2)]-ethylene of the formula

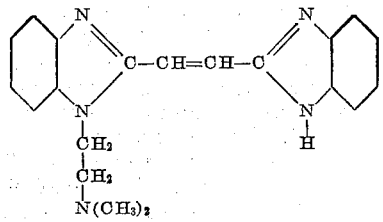

(see Example 2). By using α-[benzimidazyl-(2)]-β-[N - (diethylaminoethyl) - benzimidazyl-(2)]-ethylene, which can be obtained by the procedure described in Example 2 from diethyl-β-chlorethylamine hydrochloride instead of α-[benzimidazyl - (2)] - β-[N-(dimethylaminoethyl)-benzimidazyl-(2)]-ethylene, there is obtained a soap preparation having similar properties.

Example 9

0.005–0.5 part of α-[benzimidazyl-(2)]-β-[N-hydroxyethylbenzimidazyl - (2)] - ethylene (see Example 3) is added at 70–80° C. to a solution of 100 parts of soap in 200 parts of water.

As soon as a homogeneous solution has been obtained it is allowed to cool. There is obtained a soap-like preparation. Textile goods which have been washed with this preparation possess a whiter appearance than material which has been washed with soap alone.

The proportion of the optical bleaching agent used above may be decreased or increased.

Example 10

The procedure is the same as that described in Example 7, except that 0.2 part of α-[benzimidazyl-(2)]-β-[N-benzyl-benzimidazyl-(2)]-ethylene (see Example 4) is used instead of α-[benzimidazyl-(2)]-β-[N-methyl - benzimidazyl-(2)]-ethylene.

Example 11

The sodium salt of 2-heptadecyl-N-benzyl-benzimidazyl-disulfonic acid is mixed with 0.01–0.5 per cent. of finely pulverized α-[benzimidazyl-(2)]-β-[N-hydroxyethylbenzimidazyl-(2)]-ethylene. Textile goods which have been washed in the usual manner with this mixture possess a higher whiteness than goods which have been treated with the aforesaid sodium salt alone.

Instead of the above mentioned sodium salt there may be used an alkali salt of a sulfonic acid of another benzimidazole which contains a higher alkyl residue, or mixtures of such alkali salts of sulfonated benzimidazoles containing alkyl residues having different chain lengths. There may also be used other α:β-di-[benzimidazyl-(2)]-ethylenes which contain at least one substituent at the nitrogen atom. There also come into consideration mixtures with other synthetic washing agents for example, fatty alcohol sulfonates or condensation products of higher fatty acids with aliphatic hydroxy- or amino-sulfonic acids. The synthetic washing agents may also be added to mixtures of the foregoing benzimidazylethylenes.

Example 12

The procedure is the same as that described in Example 9 except that 0.01–0.3 part of α-[benzimidazyl-(2)] - β - [N-ethyl-benzimidazyl-(2)]-ethylene is used instead of α-[benzimidazyl-(2)]-β-[N-hydroxyethyl-benzimidazyl-(2)]ethylene.

Example 13

Cotton is treated in the cold with an aqueous solution containing 0.05 per cent. of α-[benzimidazyl-(2)]-β-[N-methyl-benzimidazyl-(2)]-ethylene in the form of its formate, and the material is dried.

The above solution may be prepared by dissolving the aforesaid diimidazole in a small quantity of formic acid and pouring the solution into water.

In this manner the treated material is strongly brightened.

Example 14

The sodium salt of sulfonated μ-heptadecyl-benzimidazole is mixed with 0.01–0.5 per cent. of finely pulverised α-[benzimidazyl-(2)]-β-[N-methyl - benzimidazyl - (2)] - ethylene. Undyed textile goods which have been washed in the usual manner with this mixture possess a higher whiteness than the same material which has been treated only with the aforesaid sodium salt.

Example 15

2 parts of resin size are added to a paper pulp containing 100 parts of paper in a Hollander, and after 15 minutes 0.05 part of the product obtained as described in Example 3 dissolved in 1 part of alcohol with the addition of 0.05 part of caustic soda solution of 30 per cent. strength, is added. After a further 15 minutes, 3 parts of aluminium sulfate are added. The paper mass so treated is then passed through the mixing vat to the paper machine.

Paper treated in this manner has a higher whiteness than the untreated paper.

Example 16

The following discharge preparation is printed on a cellulose fabric dyed with 4 per cent. of the dyestuff of the formula

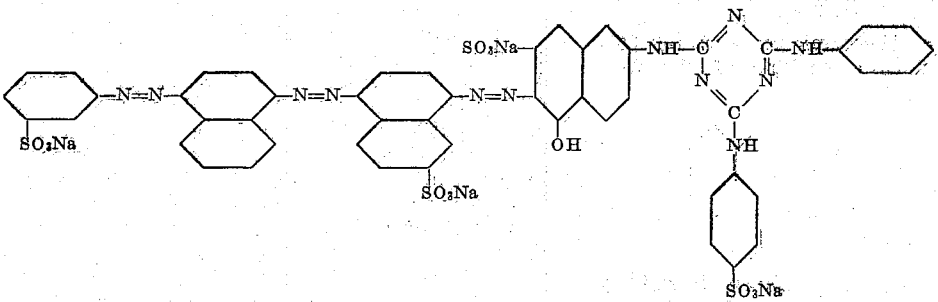

170 grams of sodium formaldehyde-sulfoxylate,
510 grams of gum thickening 1:1,
10 grams of a solution containing 1 gram of the product of Example 3, 8 grams of alcohol, and 1 gram of caustic soda solution of 30 per cent. strength,
310 grams of water
─────
1,000 grams The printed material is dried, steamed, rinsed and again dried.

The discharged parts have a higher whiteness than can be obtained without the addition of the above mentioned product of Example 3.

Example 17

0.005–0.05 per cent. (calculated on the acetyl cellulose) of the product of Example 1 is added to an acetyl-cellulose spinning solution containing about 25 per cent. of acetyl-cellulose. The threads produced with this spinning solution have a paler appearance than threads which are obtained without the above addition.

Example 18

0.1–0.2 per cent. (calculated on the cellulose content) of the product of Example 3 is added to a viscose spinning solution. The material obtained from this mixture by regeneration of the cellulose has a paler appearance than a viscose spinning solution not having the aforesaid addition.

Example 19

2.7 parts of α-[benzimidazyl-(2)]-β-[6-methyl-benzimidazyl-(2)]-ethylene are added to a boiling solution of 0.7 part of sodium in 50 parts of alcohol. As soon as dissolution has occurred, there is added in the course of 1 hour a mixture of 1.4 parts of ethylene chlorhydrin and 5 parts of alcohol.

The whole is maintained at a gentle boil for a further hour, and poured into water. The precipitated diimidazole of the formula

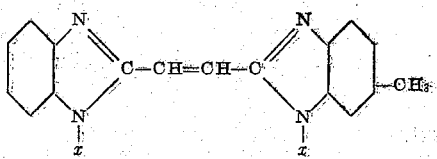

in which one $x$ represents hydrogen and the other $x$ the radical $OH-CH_2-CH_2-$, is separated by filtration, washed neutral with water and dried. It may be purified by way of its hydrochloride or by recrystallisation from alcohol. It is a pale yellow powder. In alkaline solution it exhibits a violet-blue fluorescence. The above-mentioned starting material may be obtained in the following manner:

19 parts of β-[benzimidazyl-(2)]-proprionic acid and 12.2 parts of 1-methyl-3:4-diaminobenzene are boiled with 150 parts of hydrochloric acid of 15 per cent. strength under reflux for 24 hours, and then allowed to cool. The crystals which precipitate are separated by filtration; if necessary, the remainder of the diimidazole is separated from the filtrate by the addition of sodium chloride or concentrated hydrochloric acid, and washed with sodium chloride solution. The resulting hydrochloride of α-[benzimidazyl-(2)]-β-[6-methyl-benzimidazyl-(2)]-ethane may be purified by recrystallisation from dilute hydrochloric acid. The free base can be obtained in the form of a colorless powder, which is insoluble in water, by precipitation from a hydrochloric acid solution with ammonia.

5.6 parts of the resulting α-[benzimidazyl-(2)]-β-[6-methylbenzimidazyl-(2)]-ethane are dissolved hot in 30 parts of glacial acetic acid, and heated at the gentle boil in a reflux apparatus for 3 hours with a solution of 13.6 parts of mercuric acetate in 60 parts of glacial acetic acid. After a few minutes there forms in the originally clear reaction solution a thick yellow colored magma which in time becomes thinner. After the heating operation the glacial acetic acid is removed by distillation under reduced pressure. The dry residue is boiled with 180 parts of alcohol and 30 parts of caustic soda solution of 10 per cent. strength for a few hours in a reflux apparatus. The reaction mixture is then filtered hot through a folded filter. The clear filtrate is freed from alcohol by distillation. The residue is then acidified with hydrochloric acid, and concentrated ammonia solution is added until the reaction is strongly alkaline. The precipitated dehydrogenation product is separated by filtering with suction, washed neutral with water and dried.

The resulting α-[benzimidazyl-(2)]-β-[6-methyl-benzimidazyl-(2)]-ethylene is a pale yellow powder which dissolves in alcohol to give solutions which exhibit a strong pale blue fluorescence.

Example 20

77 parts of diethyl sulfate and also caustic soda solution of 30 per cent strength are added in the course of 1 hour at 70–80° C. to a solution of 38 parts of β-[benzimidazyl-(2)]-propionic acid in 300 parts of alcohol and 50 parts of caustic soda solution of 30 per cent. strength, care being taken that the reaction mixture has an alkaline reaction throughout. The whole is maintained for a further hour at the same temperature, 400 parts of water are added, the whole is stirred for 1 hour at 80° C., sodium chloride or another salting out agent is added, and the whole is allowed to cool. The precipitated sodium salt of β-[N-ethylbenzimidazyl-(2)]-propionic acid is separated by filtration, washed with sodium chloride solution and dried. It is a colorless powder which dissolves easily in water.

22 parts of sodium β-[N-ethyl-benzimidazyl-(2)]-propionate and 12 parts of 1-methyl-3:4-diaminobenzene are boiled with 200 parts of hydrochloric acid of 15 per cent. strength for 10 hours under reflux, and then allowed to cool. The precipitated hydrochloride of α-[N-ethyl-benzimidazyl-(2)]-β-[6-methyl-benzimidazyl-(2)]-ethane is separated by filtration and washed with hydrochloric acid of 15 per cent. strength. In order to prepare the base the hydrochloride is dissolved hot in dilute hydrochloric acid and the base is precipitated with ammonia. The base is separated by filtration, washed neutral with water, and dried. It is a colorless powder which is insoluble in water.

6 parts of the resulting α-[N-ethylbenzimidazyl-(2)]-β-[6-methyl-benzimidazyl-(2)]-ethane are dissolved in 30 parts of hot glacial acetic acid, and the solution is heated with a solution of 13.6 parts of mercuric acetate in 60 parts of glacial acetic acid for 1½ hours at the gentle boil. After a short time a yellow magma precipitates which again passes into solution and metallic mercury settles to the bottom. After being heated the solution is poured off and the glacial acetic acid is distilled under reduced pressure. The dry residue is digested with hydrochloric acid and then concentrated ammonia solution is added in excess. The precipitated base is separated by filtering with suction, washed neutral with water and then dried. The dry product is extracted at the boil with tetrachlorethane, the solvent is then removed by distillation, and the residue is extracted with alcohol. By distilling off the alcohol the purified dehydrogenation product is obtained as a residue.

The resulting α-[N-ethylbenzimidazyl-(2)]-β-[6-methylbenzimidazyl-(2)]-ethylene is a pale yellow powder which is easily soluble in alcohol. Very dilute alcoholic solutions thereof exhibit a strong violet-blue fluorescence.

Example 21

To a sodium hypochlorite bath containing 2 grams of active chlorine per liter there is added 0.005 gram of α-[N-ethyl-benzimidazyl-(2)]-β-[6-methyl-benzimidazyl-(2)]-ethylene per liter. Cellulosic material which has been treated in this bath has a brighter appearance than such material after treatment in a bath without an addition of the above diimidazole.

Example 22

100 parts of soap are ground with 20 parts of sodium perborate, 40 parts of sodium metasilicate, and 0.04 part of α-[benzimidazyl-(2)]-β-[N-hydroxyethyl-benzimidazyl-(2)]-ethylene to form a powder.

Undyed cellulosic material which has been washed in the ordinary manner in a bath containing the above mixture shows a whiter appearance than such material which has been washed without this diimidazole.

Example 23

38 parts of β-[benzimidazyl-(2)]-propionic acid, dissolved in 200 parts of glacial acetic acid, are gently boiled with a solution of 136 parts of mercuric acetate in 600 parts of glacial acetic acid for 5 hours. A small quantity of solid components is filtered off, and the glacial acetic acid is then distilled under reduced pressure. The residue is refluxed with 1200 parts of hydrochloric acid of 4 per cent. strength. The solution is filtered while hot to remove insoluble parts and hydrogen sulfide is run into the hot filtrate until no more precipitations occur. The reaction mass is filtered while hot and the mercuric sulfide is washed out with hot, dilute hydrochloric acid. The filtrate is neutralized and evaporated to dryness. The residue is boiled with 2000 parts of butanol, filtered to remove the insoluble portion and the solvent removed by distillation under reduced pressure. The residue is dissolved in 700 parts of water, and the solution extracted with ether for 20 hours, whereupon the ether is removed by heating the aqueous solution. The cooled aqueous solution is carefully rendered very slightly acid to litmus with the aid of hydrochloric acid, when it becomes turbid, and a finely crystallized precipitate obtained by allowing the solution to stand for 24 hours. The precipitate is suction-filtered and washed with some water. The β-[benzimidazyl-(2)]-acrylic acid which has been formed can be further purified by recrystallization from boiling water.

9.4 parts of β-[benzimidazyl-(2)]-acrylic acid are boiled with 7 parts of 1-methylamino-2-aminobenzene and 250 parts of aqueous hydrobromic acid of 40 per cent. strength for 18 hours in a reflux apparatus and then allowed to cool.

The separated hydrobromide of α-[benzimidazyl-(2)]-β-[N-methyl-benzimidazyl-(2)]-ethylene is filtered off. It can be purified by recrystallization from aqueous hydrobromic acid. The base is obtained from a solution of the hydrobromide by precipitating with ammonia. The new base is a pale yellow, crystalline powder which, when dissolved in alcohol or acetone, shows a violet blue fluorescence.

What we claim is:

1. A process for the manufacture of a new N-monosubstituted diimidazole of the general formula

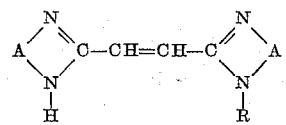

wherein A is an aromatic radical in which two vicinal carbon atoms are bound to the nitrogen atoms of the imidazole rings and R is a member selected from the group consisting of lower alkyl, lower hydroxyalkyl and benzyl radicals, which comprises condensing a solution of an alkali salt of a diimidazole of the general formula

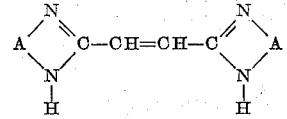

wherein A has the meaning given above, with a member selected from the group consisting of lower alkylating, lower hydroxy alkylating and benzylating agents, the amount of this agent being at least one mol and less than 2 mols calculated on one mol of diimidazole.

2. A process for the manufacture of a new N-mono-substituted diimidazole of the general formula

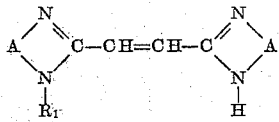

wherein A is an aromatic radical in which two vicinal carbon atoms are bound to the nitrogen atoms of the imidazole rings and $R_1$ is lower alkyl which comprises condensing a solution of one mol of an alkali salt of a diimidazole of the general formula

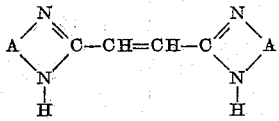

wherein A has the meaning given above with at least one mol and at most two mols of a lower alkylating agent.

3. A process for the manufacture of a new N-mono-substituted diimidazole of the general formula

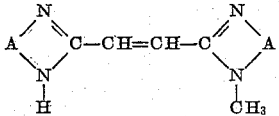

wherein A is a radical of the benzene series in which two vicinal carbon atoms are bound to the nitrogen atoms of the imidazole rings, which comprises condensing a solution of one mol of an alkali salt of a diimidazole of the general formula

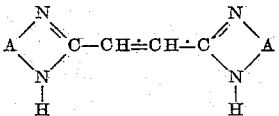

wherein A has the meaning given above with at least one mol and at most two mols of a methylating agent.

4. A process for the manufacture of a new N-mono-substituted diimidazole of the formula

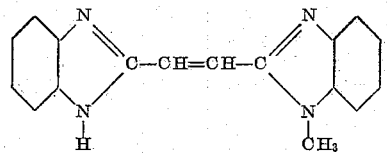

which comprises condensing a solution of one mol of an alkali salt of the diimidazole of the formula

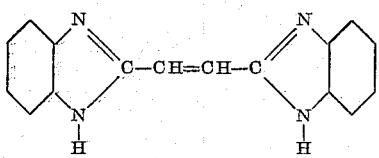

with 1.25 to 1.5 mols of methyl chloride.

5. A process for the manufacture of a new N-mono-substituted diimidazole of the general formula

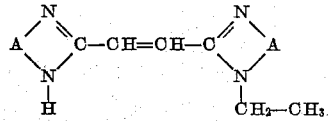

wherein A is a radical of the benzene series in which two vicinal carbon atoms are bound to the nitrogen atoms of the imidazole rings, which comprises condensing a solution of one mol of an alkali salt of a diimidazole of the general formula

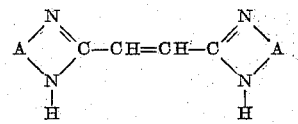

wherein A has the meaning given above with at least one mol and at most two mols of an ethylating agent.

6. A process for the manufacture of a new N-mono-substituted diimidazole of the formula

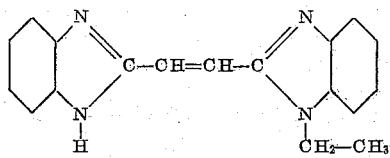

which comprises condensing a solution of one mol of an alkali salt of the diimidazole of the formula

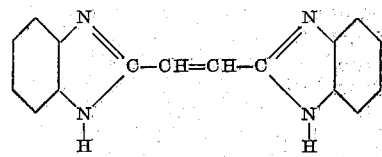

with 1.25 to 1.5 mols of diethyl sulfate.

7. A process for the manufacture of a new N-mono-substituted diimidazole of the general formula

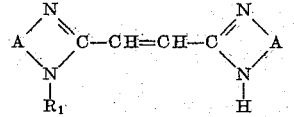

wherein A is a radical of the benzene series in which two vicinal carbon atoms are bound to the nitrogen atoms of the imidazole rings and $R_1$ is lower hydroxyalkyl, which comprises condensing a solution of one mol of an alkali salt of a diimidazole of the general formula

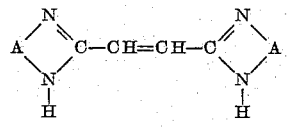

wherein A has the meaning given above with at least one mol and at most two mols of a hydroxy alkylating agent.

8. A process for the manufacture of a new N-mono-substituted diimidazole of the formula

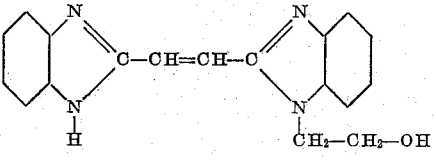

which comprises condensing a solution of one mol of an alkali salt of the diimidazole of the formula

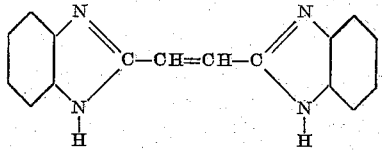

with 1.25 to 1.5 mols of ethylene chlorohydrin.

9. A diimidazole of the general formula

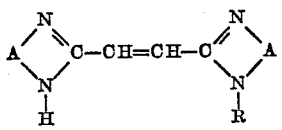

wherein A is an aromatic radical in which two vicinal carbon atoms are bound to the nitrogen atoms of the imidazole rings and R is a member selected from the group consisting of lower alkyl, lower hydroxyalkyl and benzyl radicals.

10. A diimidazole of the general formula

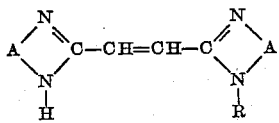

wherein A is a radical of the benzene series in which two vicinal carbon atoms are bound to the nitrogen atoms of the imidazole rings and R is a lower alkyl.

11. The diimidazole of the formula

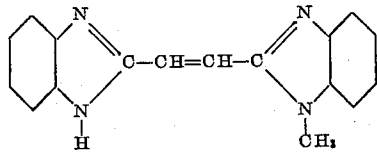

12. The diimidazole of the formula

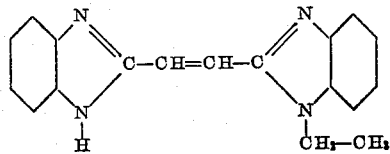

13. A diimidazole of the general formula

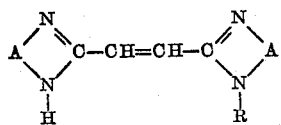

wherein A is an aromatic radical in which two vicinal carbon atoms are bound to the nitrogen atoms of the imidazole rings and R is lower hydroxy alkyl.

14. A diimidazole of the general formula

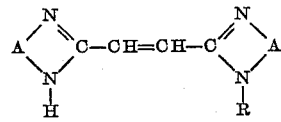

wherein A is a radical of the benzene series in which two vicinal carbon atoms are bound to the nitrogen atoms of the imidazole rings and R is lower monohydroxy alkyl, the hydroxy group being at the end of the carbon chain.

15. A diimidazole of the formula

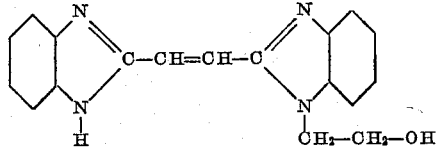

FRANZ ACKERMANN.
JULES MEYER.

No references cited.